Nov. 24, 1942.  G. A. ARMSTRONG  2,303,154

MEASURING TUBE

Filed Dec. 16, 1941

Visible width of strip, empty.

Visible width of strip, filled.

Inventor
George A. Armstrong,

By Prevost & Prevost

Attorneys

Patented Nov. 24, 1942

2,303,154

UNITED STATES PATENT OFFICE 2,303,154

MEASURING TUBE

George A. Armstrong, Vineland, N. J., assignor to Ace Glass Incorporated, Vineland, N. J., a corporation of New Jersey Application December 16, 1941, Serial No. 423,220

3 Claims. (Cl. 73—327)

This invention relates to improvements in glassware, and more particularly to novel volumetric laboratory glassware.

The primary object of the invention is to provide volumetric laboratory glassware or the like with means which makes the meniscus of the liquid level much easier to locate in relation to calibrations or other types of markings on the glassware.

With the foregoing object outlined and with other objects in view which will appear as the description proceeds, the invention consists in the novel features hereinafter described in detail, illustrated in the accompanying drawing, and more particularly pointed out in the appended claims.

Figure 1:
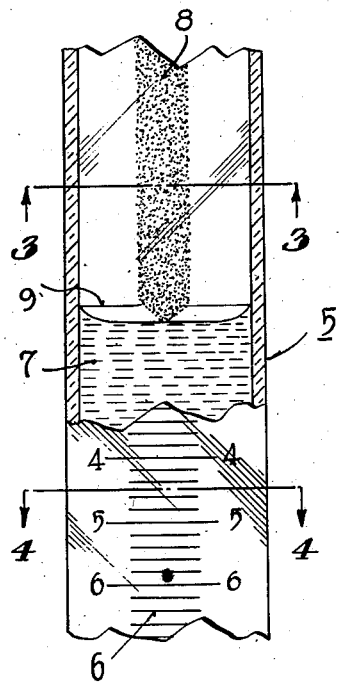
Fig. 1 is a fragmentary elevation, partly in vertical section, of a glass tube of the type employed in various kinds of volumetric laboratory glassware, with liquid therein and my improvement applied.
Figure 2:
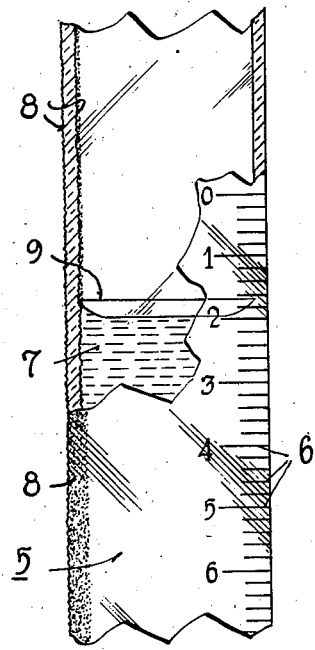
Fig. 2 is a similar view but taken at right angles to the view of Fig. 1.
Figure 3:
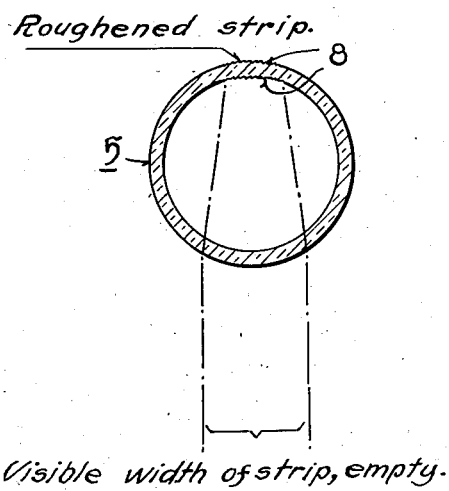
Fig. 3 is a horizontal sectional view of the empty portion of the tube and taken on the line 3—3 of Fig. 1.

Referring to the drawing, 5 designates a conventional transparent glass tube provided at one side with the usual calibration marks 6 and containing liquid 7.

In accordance with my invention, the surface of the tube (either the interior or exterior surface), opposite the viewing side, is roughened by sand blast, grinding or frosting to form a vertical indicating strip 8 which makes it much easier to locate the meniscus 9 at the top of the liquid 7.

Figure 4:
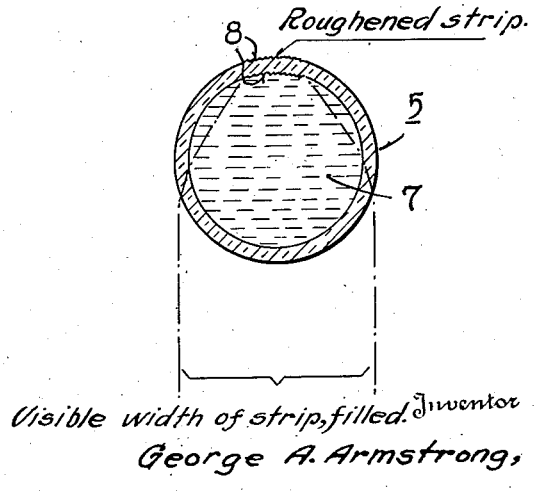
Fig. 4 is a similar view of the liquid containing portion of the tube, and taken on the line 4—4 of Fig. 1.

The roughened area on the tube is of such a width that in the empty portion of the tube, the strip appears to cover about one-third of the width of the instrument. In other words, the width of the strip is substantially one-third the diameter of the bore of the tube. Owing to such strip, the filled portion of the instrument or tube appears to be completely backed by the roughened area, due to the refraction of the liquid in that portion, as is evident from Fig. 4.

This improvement supplies a diffused light to the filled portion of the tube and eliminates highlights and confusing shadows in the meniscus which is used as an index against etched or other markings on the viewing side of the tube.

It is well known that shadows and highlights are obnoxious on the existing tubes of volumetric glassware, and cause a great deal of trouble in the laboratory, namely, eye strain, error in reading the instruments, and delay in locating the meniscus against the etched or other marking on the tube. This last factor causes erroneous readings, because instruments are calibrated to be read after delivery of liquid, and a delay may cause mismeasurment since the side wall of the instrument drains and quickly changes the level originally assumed by the meniscus.

It will be obvious that my improvement may be applied to tubes or instruments either in the course of manufacture or which have been previously manufactured, and when once applied, will become an integral part of the instrument. Furthermore, my invention is not only useful in connection with volumetric laboratory glassware, but can be employed in thermometers, barometers, etc., or in any instrument where an indicating liquid is employed in a glass tube.

While I have disclosed what I consider a preferred embodiment of the invention in such manner that the same may be readily understood by those skilled in the art, I am aware that changes may be made without departing from the spirit of the invention as expressed in the following claims.

What is claimed and desired to be secured by Letters Patent is:

1. A transparent glass measuring tube adapted to contain an indicating liquid and having a calibrated viewing surface at one side thereof, the diametrically opposite side of the tube being provided with a roughened strip extending lengthwise of the tube, parallel to its axis, said strip being of materially less width than the diameter of the bore of the tube.

2. A thin-walled indicator tube of transparent material having a viewing surface at one side thereof, a diametrically opposite surface of the tube being provided with a roughened strip extending lengthwise of the tube, parallel to its axis, said strip being of materially less width than the diameter of the bore of the tube.

3. A transparent glass measuring tube adapted to contain an indicating liquid and having a calibrated viewing surface at one side thereof, the diametrically opposite outside surface of the tube being provided with a roughened strip extending lengthwise of the tube, parallel to its axis, and adapted to diffuse light through a filled portion of the tube and eliminate highlights and confusing shadows in the meniscus, said strip being of materially less width than the diameter of the bore of the tube.

GEO. A. ARMSTRONG.